(12) United States Patent
Jin et al.

(10) Patent No.: US 9,699,295 B2
(45) Date of Patent: Jul. 4, 2017

(54) METHOD FOR DISPLAYING AN ICON AND TERMINAL DEVICE THEREOF

(71) Applicant: Xiaomi Inc., Beijing (CN)

(72) Inventors: Fan Jin, Beijing (CN); Daqing Sun, Beijing (CN); Ying Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 358 days.

(21) Appl. No.: 14/153,102

(22) Filed: Jan. 13, 2014

(65) Prior Publication Data

US 2014/0325447 A1    Oct. 30, 2014

Related U.S. Application Data

(63) Continuation-in-part of application No. PCT/CN2013/085927, filed on Oct. 25, 2013.

(30) Foreign Application Priority Data

Apr. 24, 2013  (CN) .......................... 2013 1 0146121

(51) Int. Cl.
 *H04M 1/725*    (2006.01)
 *G06F 3/0481*    (2013.01)
(52) U.S. Cl.
 CPC .... *H04M 1/72544* (2013.01); *G06F 3/04817* (2013.01); *H04M 1/72597* (2013.01)
(58) Field of Classification Search
 None
 See application file for complete search history.

(56) References Cited

U.S. PATENT DOCUMENTS

| 5,479,602 | A |  | 12/1995 | Baecker et al. |
| 5,940,078 | A | * | 8/1999 | Nagarajayya ....... G06F 3/04817 715/835 |
| 2003/0210283 | A1 | * | 11/2003 | Ishii ........................ G06F 3/038 715/848 |
| 2004/0207658 | A1 | * | 10/2004 | Awada .................. G06F 9/4443 715/747 |

(Continued)

FOREIGN PATENT DOCUMENTS

| CN | 1855021 A | 11/2006 |
| CN | 102333153 A | 1/2012 |

(Continued)

OTHER PUBLICATIONS

"International Search Report for PCT/CN2013/085927".

*Primary Examiner* — Mahelet Shiberou
(74) *Attorney, Agent, or Firm* — Jun He Law Offices P.C.; James J. Zhu

(57) ABSTRACT

The present disclosure discloses a method for displaying an icon in a terminal device and the terminal device thereof. The method includes monitoring an implementation of an event which controls a display of the icon; determining animation display parameters according to properties of the icon, if the implementation of the event which controls the display of the icon is detected; and controlling the icon to be displayed in an animated manner in accordance with the animation display parameters. The present disclosure provides more enriched display effects of the icon.

15 Claims, 4 Drawing Sheets

(56) References Cited

U.S. PATENT DOCUMENTS

| | | | |
|---|---|---|---|
| 2004/0221224 A1* | 11/2004 | Blattner | H04L 12/1822 715/201 |
| 2006/0020900 A1* | 1/2006 | Kumagai | G06F 3/0482 715/767 |
| 2007/0094620 A1* | 4/2007 | Park | G06F 3/0481 715/862 |
| 2008/0222545 A1* | 9/2008 | Lemay | G06F 3/04883 715/765 |
| 2009/0164923 A1* | 6/2009 | Ovi | G06F 3/0482 715/764 |
| 2013/0067361 A1* | 3/2013 | Gehani | G06F 3/00 715/762 |

FOREIGN PATENT DOCUMENTS

| | | |
|---|---|---|
| CN | 102591626 A | 7/2012 |
| CN | 102685034 A | 9/2012 |
| CN | 103019659 A | 4/2013 |
| CN | 103226430 A | 7/2013 |
| GB | 2314492 A | 12/1997 |
| JP | 2006031560 A | 2/2006 |
| JP | 2006311498 A | 11/2006 |
| KR | 20060112112 A | 10/2006 |
| RU | 2280334 C2 | 7/2006 |

\* cited by examiner

METHOD FOR DISPLAYING AN ICON AND TERMINAL DEVICE THEREOF

CROSS REFERENCE TO RELATED APPLICATIONS

The present application is a Continuation-In-Part of International Application No. PCT/CN2013/085927 filed on Oct. 25, 2013, which is based upon and claims priority to Chinese Patent Application No. 201310146121.2 filed on Apr. 24, 2013, the entire contents of which are incorporated herein by reference.

TECHNICAL FIELD

The present disclosure generally relates to computer technology field, and more particularly, to a method for displaying an icon in a terminal device and the terminal device thereof.

BACKGROUND

Currently, with the development of application technology, various kinds of applications have emerged, and users may install these applications on a terminal device. After the applications are successfully installed, icons corresponding to the applications are displayed on an interface of an operating system of the terminal device, and the users may run the applications by clicking or double clicking the corresponding icons associated with the applications.

In general, the icons are motionless on the interface of the operating system. Even though some icons may display simple animations within itself, for example, a videotape may be scrolling in an icon, or a four-leaf clover may be gently swinging in an icon, the icon itself is still remains motionless. It can be seen that the display effects of icons are relatively simple.

SUMMARY

Embodiments of the present disclosure provide a method and a terminal device for displaying an icon, thereby enriching the display effects of the icon.

According to a first aspect of the present disclosure, there is provided a method for displaying an icon in a terminal device, and the method includes: monitoring an implementation of an event which controls a display of the icon; determining animation display parameters according to properties of the icon, if the implementation of the event which controls the display of the icon is detected; and controlling the icon to be displayed in an animated manner in accordance with the animation display parameters.

According to a second aspect of the present disclosure, there is provided a terminal device, and the terminal device includes: a processor; and a memory for storing instructions executable by the processor, wherein the processor is configured to execute the following steps: monitoring an implementation of an event which controls a display of the icon; determining animation display parameters according to properties of the icon, if the implementation of the event which controls the display of the icon is detected; and controlling the icon to be displayed in an animated manner in accordance with the animation display parameters.

According to a third aspect of the present disclosure, there is provided a non-transitory computer readable storage medium having stored therein instructions that, when executed by a processor of a terminal device, causes the device to perform the following steps: monitoring an implementation of an event which controls a display of the icon; determining animation display parameters according to properties of the icon, if the implementation of the event which controls the display of the icon is detected; and controlling the icon to be displayed in an manner in accordance with the animation display parameters.

The technical solutions provided by the embodiments of the present disclosure include the following advantages.

Through monitoring an implementation of an event which controls a display of an icon, animation display parameters are determined according to properties of the icon if the implementation of the event which controls the display of the icon is detected, and the icon is controlled to be displayed in an animated manner in accordance with the determined animation display parameters, thereby providing more enriched display effects of the icon.

It should be understood that both the above general description and the following detailed description are for illustrative purpose, rather than to limit the present disclosure.

BRIEF DESCRIPTION OF THE DRAWINGS

In order for the technical solutions in the embodiments of the present disclosure to become more apparent, a simple introduction of the accompanying drawings describing the embodiments will be given below. Obviously, the accompanying drawings only illustrate some embodiments of the present disclosure, and for those skilled in the art, other drawings may be obtained accordingly without any inventive effort.

The exemplary embodiments of the present disclosure are illustrated by the above-mentioned drawings, and detailed descriptions will be given hereinafter. These drawings and literal descriptions do not intend to limit the scope and concept of the present disclosure in any manner, but to explain the concept of the present disclosure to those skilled in the art by referring to the exemplary embodiments.

DETAILED DESCRIPTION

In order to make purposes, technical solutions and advantages of the present disclosure more apparent, hereinafter, the embodiments of the present disclosure will be further described in detail in conjunction with the accompanying drawings.

In the following paragraphs, methods and terminal devices for displaying an icon according to embodiments of the present disclosure will be elaborated. In practical applications, the methods may be implemented in a terminal device such as mobile phones, computers, digital broadcast terminals, messaging devices, gaming consoles, tablets, medical devices, exercise equipment, personal digital assistants, and the like.

The terminal device is an electronic device and includes one or more processors to receive various data, programs and instructions, and to process such data, programs and instructions accordingly. The terminal device also includes a memory which is coupled to the one or more processors and is configured to store the data, programs and instructions to be processed by the processors. Furthermore, the terminal device may further include input modules, such as a touch screen, a keyboard, a mouse or the like. These are not described in details as they would be readily apparent to those skilled in the art.

The terminal device may be provided with an operating system to implement data or instruction processing. The operating system may further include a user interface where interaction between a user and the terminal device occurs. The user interface allows the user to manipulate the operating system of the terminal device via user inputs, and allows the operating system to indicate the effects or reactions of the user's manipulation. Generally, the user interface may be a graphical interface where functional components such as menus, icons of application programs or navigation bars may be disposed. The term "icon" used herein refers to a shortcut or visual representation of the application program or data document in the user interface of the terminal device.

Figure 1:
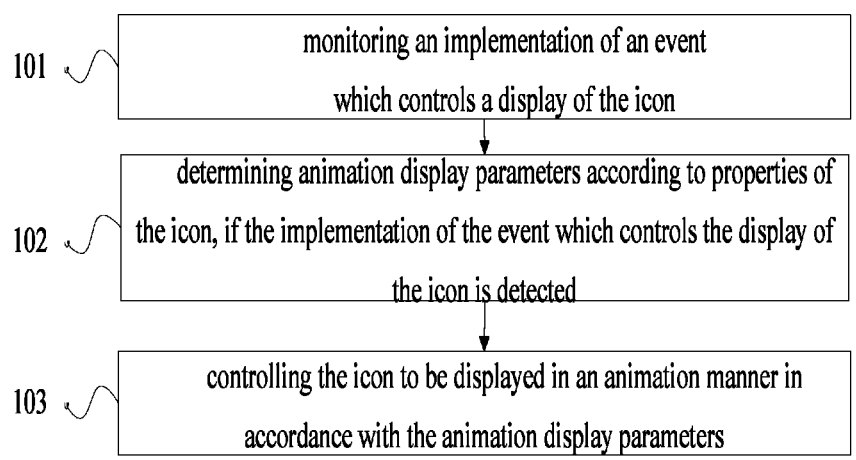
FIG. 1 is an illustrative flowchart showing a method for displaying an icon in a terminal device according to the first embodiment of the present disclosure.

The first embodiment of the present disclosure provides a method for displaying an icon in the terminal device as shown in FIG. 1.

It should be specified that, in the embodiment of the present disclosure, properties are preset for each icon, and the properties may be properties that are set by a user, or set by the terminal device according to preset rules. In general, the operating system of the terminal device has allocated an identifier of icon for each icon, for example, a name of icon for each icon. Therefore, the properties of the icon will be associated with the identifier of the icon, and corresponding nexuses between the properties of the icon and the identifier of the icon are saved, such that the properties corresponding to the icon are searched according to the preset nexuses when an event, which controls the display of the icon, is triggered.

In an embodiment of the present disclosure, the user may set the properties of the icon in a manner described below.

When the user installs a new application, a setup dialog box for the new application pops up in the case where the new application is successfully installed and the icon corresponding to the new application is added on a user interface of the terminal device. The setup dialog box contains at least one alternative properties, from which the user may choose the properties according to his/her own preference in the setup dialog box, and the selected properties will become the properties of the icon.

In addition, after the user clicks the icon and starts the operation of the application corresponding to the icon, the user may select properties of the icon in a setup menu of the application, which contains at least one alternative properties, and the selected properties will become the properties of the icon representing the application.

Alternatively, the properties of the icon may be set by the terminal device according to preset rules. In an embodiment of the present disclosure, a manner for setting properties of the icon by the terminal device according to preset rules is as follows.

When the user installs the application corresponding to the icon, the terminal device extracts related information of the application corresponding to the icon, and sets predefined properties of the icon in accordance with setting rules, wherein the related information may include contents such as a name of the application corresponding to the icon, a category of the application corresponding to the icon, application information integrated within the icon, and etc.

Furthermore, the properties either set by the user or automatically set by the terminal device may include textual contents or numeral contents, or a combination of textual contents and numeral contents.

In some embodiments, the properties may include textual contents. For example, the user may set a category of the properties of the application to be "character", and corresponding properties are "lively", "calm" or the like. Further, a display effect of the icon corresponding to a "lively" property is that the icon quickly bounces; when an event which controls the display of the icon is triggered, animation display parameters corresponding to the icon are searched according to the property and the identifier of the icon, and the icon is controlled to be displayed in an animated manner in accordance with the animation display parameters. A display effect of the icon corresponding to a "calm" property is that the icon slowly bounces; when an event which controls the display of the icon is triggered, animation display parameters corresponding to the icon are searched according to the property and the identifier of the icon, and the icon is controlled to be displayed in an animated manner in accordance with the animation display parameters.

In some embodiments, the properties may include numeral contents. Each icon may be classified into at least one category, such as category "1", category "2" and category "3". Accordingly, each icon will be allocated with a category number, such as category "1". Similarly, each icon may be classified with other classification rules, such as level and aggressivity. For example, the predefined properties of the icon of an installed application "Weibo" ("Weibo" is a Chinese word for "microblog", which is a social platform application mostly used in China) could be set as category "1", level "3" and aggressivity "5". As another example, the predefined properties of the icon of a newly added application "Twitter" could be set as category "1", level "6" and aggressivity "7". Setting rules herein may be preset within the terminal device, and may be updated periodically.

Further, a manner of controlling the icon to be displayed in the animated manner may be classified into two types described below. The icon may include an initial icon and one or more regeneration icons.

1) Property animation: after the application corresponding to the icon is installed, the initial icon of the application will appear on the user interface, and when the icon is controlled to be displayed in an animated manner in accordance with animation parameters, the initial icon moves in different directions on a screen at a set frequency. For example, the initial icon is controlled to move up, down, left and right, and a visual effect of such movement in a high frequency and small distance will show that the initial icon is bouncing. For example, the icon and another icon adjacent to the icon in right or left are controlled to move towards each other in opposite directions, and a visual effect of such movement in high frequency and small distance will show the icons are colliding with each other.

2) Sequence frame: after the application corresponding to the icon is installed, the initial icon of the application will appear on an interface, and the regeneration icons are generated based on a set frame of the initial icon. Taking the icon corresponding to an application of "Messages" as an example, the initial icon is an envelope located in the middle, and 4 regeneration icons are generated, wherein the 4 regeneration envelopes are located at upper left, upper right, lower right and lower left respectively. When the icon is controlled to be displayed in an animated manner in accordance with the animation display parameters, the initial icon and the regeneration icons are displayed in a set sequence at a set frequency in a display area of the icon, and when the frequency is high, the icon will appear to be bouncing.

A flowchart of the method according to the first embodiment of the present disclosure includes the following steps.

In step 101, the method includes monitoring an implementation of an event which controls a display of the icon.

In step 102, the method includes determining animation display parameters according to properties of the icon, if the implementation of the event which controls the display of the icon is detected.

In step 103, the method includes controlling the icon to be displayed in an animated manner in accordance with the animation display parameters.

In the embodiment of the present disclosure, through monitoring the implementation of the event which controls the display of the icon, animation display parameters are determined according to properties of the icon if the implementation of the event which controls the display of the icon is detected, and the icon is controlled to be displayed in the animated manner in accordance with the determined animation display parameters, thereby providing more enriched display effects of the icon, and more specifically, expressivity of the icon as well as interactivity between applications and the user are improved.

Figure 2:
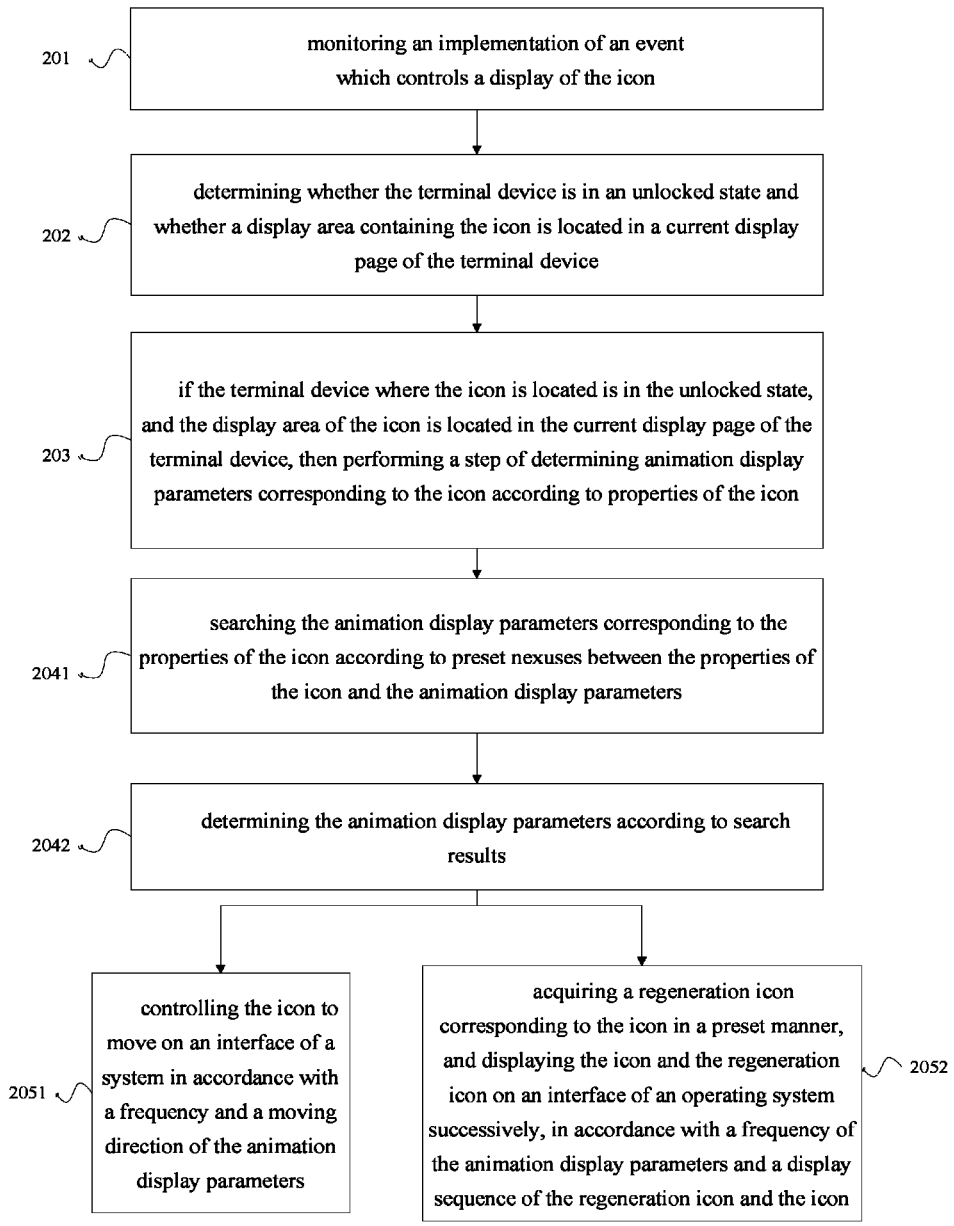
FIG. 2 is an illustrative flowchart showing a method for displaying an icon in a terminal device according to the second embodiment of the present disclosure.

The second embodiment of the present disclosure provides a method for displaying an icon in the terminal device as shown in FIG. 2.

It should be specified that properties of the icon in the embodiment of the present disclosure are predefined types of characters, and the method for displaying the icon is a method for displaying single icon.

A flowchart of the method in the embodiment of the present disclosure includes the following steps.

Step 201 includes monitoring an implementation of an event which controls a display of the icon.

The event which controls the display of the icon may be the situations below.

Firstly, the event may be an application corresponding to the icon receives new service notification.

When the application receives the new service notification, an indication may be added on the icon of the application to inform the user. For example, when the terminal device has missed calls or unread messages, the number of the missed calls or the number of the unread messages is added on a phone icon or a message icon as an indication to inform the user. At this time, receiving the new service notification by the application of the terminal device is considered as a triggering event that controls the display of the icon.

Further, when the application corresponding to the icon receives new service notification, it is also required the determination of the current state of the terminal device, so as to decide whether to perform the step of controlling the icon to be displayed. The determination method is provided in step 202.

Secondly, the event could be clicking of the icon by the user.

The terminal device may implement double clicking the icon as starting the operation of the application, thus, the event which controls the display of the icon may be triggered when the application is clicked once. Since an action of single clicking the icon and double clicking the icon are determined by the terminal device, thus it may be configured to trigger the event which controls the display of the icon, when the time, counting from the start of the first click, is longer than a pre-set time taken for double clicking the icon.

Step 202 includes determining whether the terminal device is in an unlocked state and whether a display area containing the icon is located in a current display page of the terminal device.

For the situation where the application corresponding to the icon receives new service notification as shown in step 201, when there is a missed call or an unread short message, the terminal device might be in a locked state, at this time, the user cannot see any icon, so there is no need to control the display effects of the icon. Thus, it is required to add a determination step before that properties of the icon are searched; only when the terminal device is in the unlocked state, and where the icon that receives new service notification is located in the current display page, the step of searching of the properties of the icon is performed.

For the situation where the user clicks the icon as shown in step 201, the terminal device must be in the unlocked state during this event, thus a process of performing step 202 is not necessary. At this time, step 204 is performed directly.

In step 203, if the terminal device where the icon is located is in the unlocked state, and the display area of the icon is located in the current display page of the terminal device, then step 204 is performed.

Step 204 includes determining animation display parameters according to properties of the icon.

The process of determining the animation display parameters in step 204 may include the following steps.

In step 2041, the process includes searching the animation display parameters corresponding to the properties of the icon according to preset nexuses between the properties of the icon and the animation display parameters.

In step 2042, the process further includes determining the animation display parameters according to search results.

In preset nexuses between properties and an identifier of the icon, the properties of the icon can be searched according to the identifier of the icon corresponding to the event which controls the display of the icon.

Taking a phone icon as an example, if the terminal device has a missed call, then an event, which controls the display of the phone icon, is triggered by an application corresponding to the phone icon. The preset nexuses between properties and an identifier of the phone icon are searched through the identifier of the phone icon, thereby acquiring that the property corresponding to the phone icon is "lively". Taking a message icon as an example, if the terminal device has an unread message, an event, which controls the display of the message icon, is triggered by an application corresponding to the message icon. The preset nexuses between properties and an identifier of the message icon are searched through the identifier of the message icon, thereby acquiring that the property corresponding to the message icon is "calm".

After acquiring the properties of the icon, the animation display parameters of the icon corresponding to the properties of the icon are searched according to preset nexuses between the properties of the icon and the animation display parameters.

Thereafter, the preset nexuses between the properties of the icon and the animation display parameters are searched through the identifier of the phone icon and property of "lively", animation display parameters corresponding to the property "lively" are obtained, thus, animation display parameters corresponding to an animation of "quickly bounces" are obtained, wherein the animation display parameters include: moving frequency of the phone icon is First Frequency; and moving manner of the phone icon is to control the phone icon to move upward a preset distance and move back to the initial position after reaching the preset distance.

The preset nexuses between the properties of the icon and the animation display parameters are searched through the identifier of the message icon and property of "calm", animation display parameters corresponding to the property of "calm" are obtained, thus, animation display parameters corresponding to an animation of "slowly bounces" are obtained, wherein the animation display parameters include: moving frequency of the message icon is Second Frequency; and moving manner of the message icon is to control the message icon to move upward a preset distance and move back to the initial position after reaching the preset distance, wherein the First Frequency is greater than the Second Frequency.

Step 205 includes controlling the icon to be displayed in an animated manner in accordance with the animation display parameters.

Wherein, a specific manner of displaying the icon may be classified into the following two types.

2051 includes controlling the icon to move on an interface of an operating system in accordance with a frequency and a moving direction of the animation display parameters; or 2052 includes acquiring a regeneration icon corresponding to the icon in a preset manner, and displaying the icon and the regeneration icon on the interface of the operating system successively, in accordance with a frequency of the animation display parameters and a display sequence of the regeneration icon and the icon.

The present embodiment employs the manner of 2051.

At this time, if the terminal device has a missed call, then the phone icon is displayed in a manner that it "quickly bounces", which gives the user a feeling of "hurry come to see me, and open me up immediately"; and if the terminal device receives a new message and the message is unread, then the message icon is displayed in a manner that it "slowly bounces", which gives the user a feeling of "ah, a new short message, check it if you are not busy", thereby improving interactivity between the icon and the user, and providing a more intuitive manner to inform the user of a situation of the application corresponding to the icon.

In the embodiment of the present disclosure, through monitoring the implementation of the event which controls the display of the icon, animation display parameters are determined according to properties of the icon if the implementation of the event which controls the display of the icon is detected, and the icon is controlled to be displayed in an animated manner in accordance with the determined animation display parameters, thereby providing more enriched display effects of the icon, and more specifically, expressivity of the icon as well as interactivity between applications and the user are improved.

Figure 3:
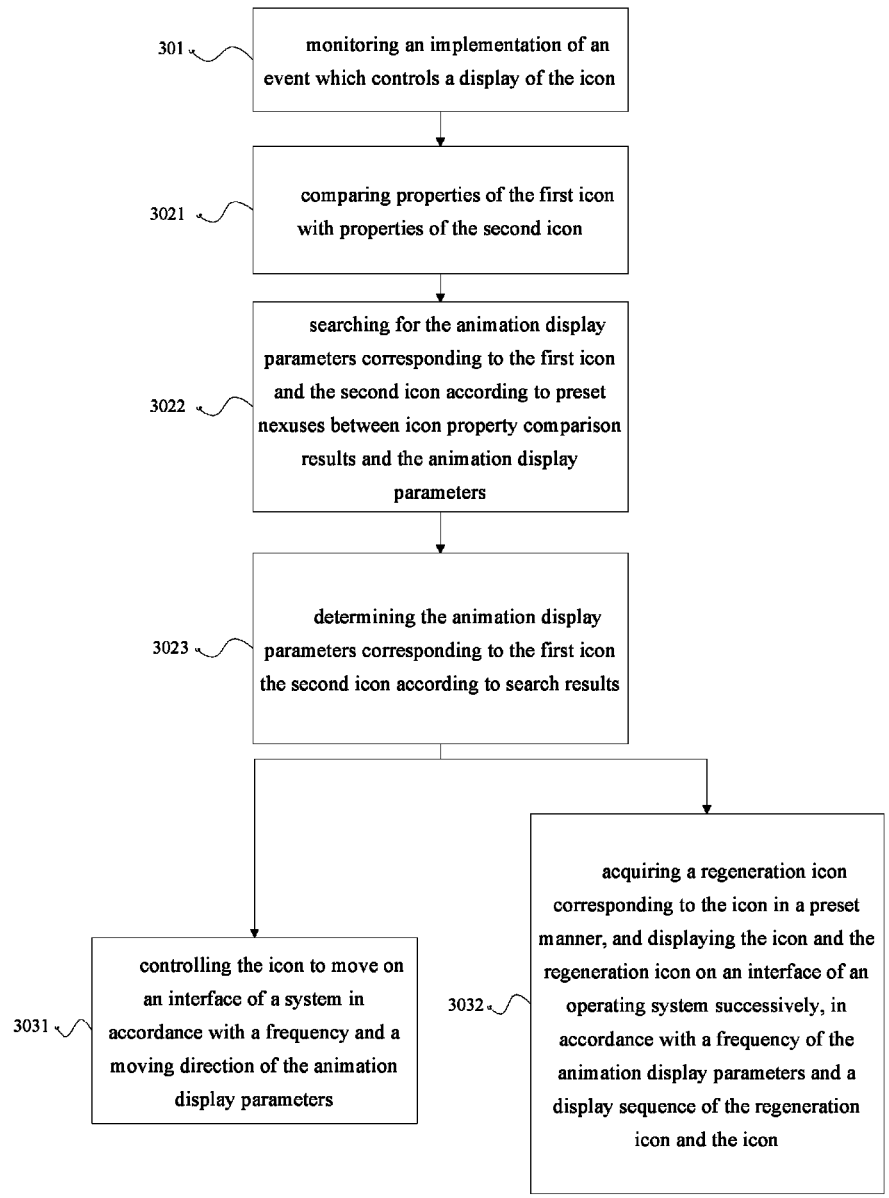
FIG. 3 is an illustrative flowchart showing a method for displaying an icon in a terminal device according to the third embodiment of the present disclosure.

The third embodiment of the present disclosure provides a method for displaying an icon in the terminal device as show in FIG. 3.

It should be explained that properties of the icon in the embodiment of the present disclosure include one or more properties of category, level and aggressivity, and the method for displaying the icon is a method for interactively displaying a plurality of icons, which includes a first icon for which an event controls the display of the icon is detected, and a second icon adjacent to the first icon.

Further, some steps of descriptions are the same as those of Embodiment 2, which are omitted herein.

A flow of the method in the embodiment of the present disclosure includes the following steps.

Step 301 includes monitoring an implementation of the event which controls a display of the icon.

In the embodiment of the present disclosure, the event which controls the display of the icon includes: an event of updating a position of the first icon to be adjacent to the second icon; or an event of the first icon appearing on an interface of an operating system for the first time and being adjacent to the second icon.

The event of updating the position of the first icon may be a case where the user performs an operation of changing the position of the first icon, thus the event which controls the display of the icon is triggered after the first icon is dragged to a new position. The event of the first icon appearing on the interface of the operation system for the first time may be a case where a new application is installed by the user, and the first icon corresponding to the application is added on an interface of the terminal device, thus the event which controls the display of the icon is triggered after the first icon is added.

Step 302 includes determining animation display parameters according to properties of the icon.

Wherein, the process of determining the animation display parameters according to the properties of the icon in the step 302 may include the following steps.

Step 3021 includes comparing properties of the first icon with properties of the second icon.

The second icon adjacent to the first icon may be a preceding icon adjacent to the first icon or a succeeding icon adjacent to the first icon, or the both. The preceding icon or the succeeding icon adjacent to the first icon herein may be determined according to identifiers of position arrangements of icons on the interface of the terminal device.

Further, when the first icon is located at an edge of the current interface of the terminal device, namely, only one icon is adjacent to the first icon, then only the preceding icon or the succeeding icon adjacent to the first icon is determined as the second icon.

The properties of the first and second icons are searched according to preset nexuses between the properties and identifiers of the icons.

For example, as for a first situation, after the properties of the first and second icons are searched, it is found that the category property of the first icon is set to be "1", and the level property of the first icon is set to be "5". While the category property of the second icon is set to be "1" and the level property of the second icon is set to be "10" in the first situation. As for a second situation, it is found that the category property of the first icon is set to be "1" and the aggressivity property of the first icon is set to be "strong". While the category property of the second icon is also set to be "1" and the aggressivity property of the second icon is also set to be "strong" in the second situation. As for a third situation, it is found that the category property of the first icon is set to be "1", the level property of the first icon is set to be "5", and the aggressivity property of the first icon is set to be "strong". While the category property of the second icon is set to be "1", the level property of the second icon is set to be "10", and the aggressivity property of the second icon is set to be "strong" in the third situation.

Since the properties of the first icon and the properties of the second icon respectively contain one or more property values, such as the category property value, level property value and aggressivity property value, the property values of the same type are compared with each other respectively, and comparison results of the property values in each type are determined.

After the properties of the first icon and the properties of the second icon are compared and the comparison results are determined, the method proceeds to Step 3022. Step 3022 includes searching for the animation display parameters corresponding to the first icon and the second icon according to preset nexuses between icon property comparison results and the animation display parameters.

Then, the method proceeds to Step 3023 which includes determining the animation display parameters corresponding to the first icon and the second icon according to search results.

Property values of the properties of the first icon are compared with property values of the properties of the second icon. Accordingly, comparison results of the property values of the same category may be obtained. The comparison results of the property values of the same category may be: the property values of the properties of the first icon are greater than the property values of the corresponding properties of the second icon; or the property values of the properties of the first icon are smaller than the property values of the corresponding properties of the second icon; or the property values of the properties of the first icon are equal to the property values of the corresponding properties of the second icon. Since the properties of the icons may contain a variety of properties, a final comparison results may include the comparison results corresponding to all the properties, and eventually, the animation display parameters corresponding to the comparison results are respectively searched from the preset nexuses between the comparison results and the animation display parameters according to the respective comparison results. The icons are respectively displayed in a certain sequence at the time of final displaying.

Further, the above contents are explained by some examples.

For example, as for the first situation described above, it is found that the category property of the first icon is set to be "1", and the level property of the first icon is set to be "5". While the category property of the second icon is set to be "1" and the level property of the second icon is set to be "10". In other words, the category properties of the first icon and the second icon are the same, so animation display parameters of the icons corresponding to the categories are not further determined according to the result. For the properties of "level" of the first icon and the second icon, the obtained comparison result is that "the property values of the properties of the first icon are smaller than the property values of the properties of the second icon". From the preset nexuses between the comparison results and the animation display parameters, the animation display parameters for the first and second icons are obtained based on the above comparison results. For example, animation display parameters corresponding to an animation display of "nodding to the icon with higher property values" are obtained for the first icon. While animation display parameters corresponding to an animation display of "icon heading up" are obtained for the second icon. According to the present disclosure, the animation display of "nodding to the icon with higher property values" or "icon heading up" may include a variety of optional dynamic icon forms. Herein the animation display parameters for the first icon may be set in the following manners: a generating frequency of regeneration icons corresponding to the first icon is Third Frequency and a moving manner of the first icon is to select a sequence number for each regeneration icons and to control a display sequence of the respective regeneration icons according to the sequence number. Similarly, the animation display parameters for the second icon are set in the following manners: a generating frequency of regeneration icons corresponding to the second icon is Third Frequency and a moving manner of the second icon is to select a sequence number of each regeneration icons and to control a display sequence of the respective regeneration icons according to the sequence number.

As for the second situation described above, it is found that the category property of the first icon is set to be "1" and the aggressivity property of the first icon is set to be "strong". While the category property of the second icon is also set to be "1" and the aggressivity property of the second icon is also set to be "strong" in the second situation. Since the category properties of the first icon and the second icon are the same, so animation display parameters of the icons corresponding to the categories are not further determined according to the result. For the properties of aggressivity of the first icon and the second icon, the obtained comparison result is that "the property values of the aggressivity properties of the first icon are equal to the property values of the aggressivity properties of the second icon". From the preset nexuses between the comparison result and the animation display parameters, the animation display parameters of the first and second icons are obtained. For example, animation display parameters corresponding to an animation display of "colliding with adjacent icons" are obtained for the first and second icons. In an exemplary embodiment, since the first icon is located on the left side of the second icon, the animation display parameters for the first icon may be set in the following manners: a moving frequency of the first icon is Fourth frequency and a moving manner of the first icon is to control the icon to move a preset distance to the right, and move back to the initial position after reaching the preset distance. While the animation display parameters for the second icon may be set in the following manners: a moving frequency of the second icon is Fourth frequency; and a moving manner of the second icon is to control the icon to move a preset distance to the left, and move back to the initial position after reaching the preset distance.

As for the third situation described above, it is found that the category property of the first icon is set to be "1", the level property of the first icon is set to be "5", and the aggressivity property of the first icon is set to be "strong". While the category property of the second icon is set to be "1", the level property of the second icon is set to be "10", and the aggressivity property of the second icon is set to be "strong" in the third situation. After the property values are compared, the category properties and the aggressivity properties of the first icon and the second icon are the same, but the levels of the first icon and the second icon are different. Accordingly, animations of the icons corresponding to the categories are not further determined according to the result. For the properties of level of the first icon and the second icon, the obtained comparison result is that "the property values of the properties of the first icon are smaller than the property values of the properties of the second icon". From the preset nexuses between the comparison results and the animation display parameters, the animation display parameters for the first and second icons are obtained based on the above comparison results. For example, animation display parameters corresponding to an animation display of "nodding to the icon with higher property values" are obtained for the first icon. While animation display parameters corresponding to an animation display of "icon heading up" are obtained for the second icon. According to the present disclosure, the animation display of "nodding to the icon with higher property values" or "icon heading up" may include a variety of optional dynamic icon forms. Herein the animation display parameters for the first icon may be set in the following manners: a generating frequency of regeneration icons corresponding to the first icon is Third Frequency and a moving manner of the first icon is to select a sequence number for each regeneration icons and to control a display sequence of the respective regeneration icons according to the sequence number. Similarly, the animation display parameters for the second icon are set in the following manners: a generating frequency of regeneration icons corresponding to the second icon is Third Frequency and a moving manner of the second icon is to select a sequence number of each regeneration icons and to control a display sequence of the respective regeneration icons according to the sequence number.

Furthermore, in the third situation described above, for the properties of aggressivity of the first icon and the second icon, the obtained comparison result is that "the property values of the aggressivity properties of the first icon are equal to the property values of the aggressivity properties of the second icon". From the preset nexuses between the comparison result and the animation display parameters, the animation display parameters of the first and second icon are obtained. For example, animation display parameters corresponding to an animation display of "colliding with adjacent icons" are obtained for the first and second icons. In an exemplary embodiment, since the first icon is located on the left side of the second icon, the animation display parameters for the first icon may be set in the following manners: a moving frequency of the first icon is Fourth frequency and a moving manner of the first icon is to control the icon to move a preset distance to the right, and move back to the initial position after reaching the preset distance. While the animation display parameters for the second icon may be set in the following manners: a moving frequency of the second icon is Fourth frequency; and a moving manner of the second icon is to control the icon to move a preset distance to the left, and move back to the initial position after reaching the preset distance. In this case, the display order of the two animations corresponding to the two properties of "level" and "aggressivity" is not limited.

Step 303 includes controlling the icon to be displayed in an animated manner in accordance with the animation display parameters.

Wherein, a specific manner of displaying the icon may be classified into the following two types.

3031 includes controlling the icon to move on the interface of the operating system in accordance with a frequency and a moving direction of the animation display parameters.

Alternatively, 3032 includes acquiring a regeneration icon corresponding to the icon in a preset manner, and displaying the icon and the regeneration icon on the interface of the operating system successively, in accordance with a frequency of the animation display parameters and a display sequence of the regeneration icon and the icon.

In the embodiment of the present disclosure, through monitoring the implementation of the event which controls the display of the icon, animation display parameters are determined according to properties of the icon if the implementation of the event which controls the display of the icon is detected, and the icon is controlled to be displayed in an animated manner in accordance with the determined animation display parameters, thereby providing more enriched display effects of the icon, and more specifically, expressivity of the icon as well as interactivity between applications and the user are improved.

Figure 4:
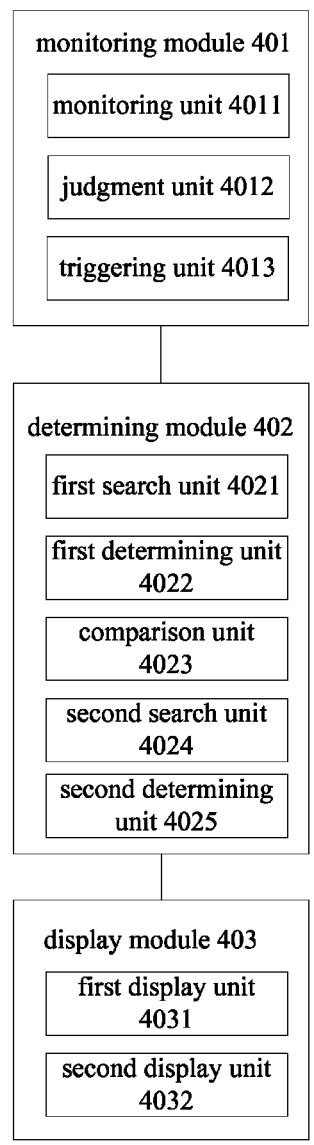
FIG. 4 is an illustrative diagram showing an apparatus for displaying an icon in a terminal device according to the forth embodiment of the present disclosure.

The forth embodiment of the present disclosure provides an apparatus for displaying an icon in the terminal device as shown in FIG. 4. The apparatus includes: a monitoring module 401 configured to monitor an implementation of an event which controls a display of the icon, and to trigger a determining module 402 to perform an operation when the event which controls the display of the icon is detected; the determining module 402 configured to determine animation display parameters according to properties of the icon; and a display module 403 configured to control the icon to be displayed in an animated manner in accordance with the animation display parameters.

Wherein, in an embodiment, the event which controls the display of the icon includes an event of receiving new service notification by an application corresponding to the icon or an event of clicking the icon by the user.

The monitoring module 401 includes: a monitoring unit 4011 configured to monitor the implementation of the event which controls the display of the icon; a judgment unit 4012 configured to determine whether the terminal device is in an unlocked state and whether a display area containing the icon is located in a current display page of the terminal device when the event which controls the display of the icon is triggered by the event of receiving new service notification by the application corresponding to the icon. The judgment unit 4012 will transmit an instruction to a triggering unit 4013 when the terminal device is in the unlocked state and the display area containing the icon is located in the current display page of the terminal device; and the triggering unit 4013 configured to trigger the determining module 402 to perform an operation when the event which controls the display of an icon is triggered by the event of clicking the icon by the user, and to receive the instruction from the judgment unit 4012 so as to trigger the determining module 402 to perform an operation.

Wherein, the determining module 402 includes: a first search unit 4021 configured to search the animation display parameters corresponding to properties of the icon according to the preset nexuses between the properties of the icon and the animation display parameters; and a first determining unit 4022 configured to determine the animation display parameters according to search results.

Wherein, the icon includes a first icon and a second icon; and the event which controls the display of an icon may include: an event of updating a position of the first icon to be adjacent to the second icon; or an event of the first icon appearing on an interface of an operating system for the first time and being adjacent to the second icon.

Wherein, the properties include category and level.

Further, the determining module 402 includes: a comparison unit 4023 configured to compare properties of the first icon with properties of the second icon; a second search unit 4024 configured to search for the animation display parameters corresponding to the first icon and the second icon according to preset nexuses between icon property comparison results and the animation display parameters; and a second determining unit 4025 configured to determine the animation display parameters corresponding to the first icon and the second icon according to the search results.

The display module 403 includes: a first display unit 4031 configured to control the icon to move on an interface of the operating system in accordance with a frequency and a moving direction of the animation display parameters; and a second display unit 4032 configured to acquire a regeneration icon corresponding to the icon in a preset manner and display the icon and the regeneration icon on an interface of the operating system successively, in accordance with a frequency of the animation display parameters and a display sequence of the regeneration icon and the icon.

In the embodiment of the present disclosure, through monitoring the implementation of the event which controls the display of the icon, animation display parameters are determined according to properties of the icon if the implementation of the event which controls the display of the icon is detected, and the icon is controlled to be displayed in an animated manner in accordance with the determined animation display parameters, thereby providing more enriched display effects of the icon, and more specifically, expressivity of the icon as well as interactivity between applications and the user are improved.

In the embodiment of the present disclosure, after an event which controls an icon to be displayed is received, properties of the icon corresponding to triggering the event are queried, animation display parameters are determined according to queried properties, and the icon is controlled to be displayed in an animated manner in accordance with the animation display parameters, such that display effects of the icon are enriched, and specifically, expressivity of the icon and interactivity of applications and the user are improved.

Those skilled in the art may appreciate that all or a part of steps in the above embodiments may be implemented by a hardware or may be implemented in a related hardware instructed by instructions stored in a non-transitory computer readable storage medium. The computer can also include the terminal device as defined in the present disclosure.

The non-transitory computer readable storage medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory of the terminal device.

The aforementioned methods can be implemented in a non-transitory computer readable storage medium recording computer-readable codes. The non-transitory computer readable storage medium includes all kinds of recording devices in which data readable by a computer system are stored. The non-transitory computer readable storage medium includes ROM, RAM, CD-ROM, magnetic tapes, floppy discs, optical data storage devices, and the like.

The orders of the above embodiments of the present disclosure are only used for description, but not for showing the superiority and inferiority of the embodiments.

It should be understood by those skilled in the art that the whole or parts of the steps in the above embodiments may be implemented by hardware, or by programs instructing the related hardware. The programs may be stored in a computer readable storage medium. The storage medium described above may be a read-only memory, a magnetic disc, an optical disc or the like.

The above descriptions are only exemplary embodiments of the present disclosure, which are not used to limit the present disclosure. Any variations, equivalent substitutions, and modifications made within the intent and principles of the present disclosure shall be encompassed in the scope of the present disclosure.

What is claimed is:

1. A method for displaying an icon in a terminal device, comprising:
   extracting related information of an application corresponding to the icon, the related information comprising a name of the application, a category of the application, and application information integrated within the icon;
   setting, based on the extracted related information, properties of the icon in accordance with setting rules:
   monitoring an implementation of an event which controls a display of the icon;
   determining animation display parameters according to properties of the icon, if the implementation of the event which controls the display of the icon is detected; and
   controlling the icon to be displayed in an animated manner in accordance with the animation display parameters;
   wherein the icon comprises a first icon and a second icon; and wherein the event which controls the display of the icon comprises:
   an event of updating a position of the first icon to be adjacent to the second icon;
   or an event of the first icon appearing on an interface of an operating system for the first time and being adjacent to the second icon;
   wherein determining the animation display parameters according to the properties of the icon comprises:
   comparing properties of the first icon with properties of the second icon;
   searching for the animation display parameters corresponding to the first icon and the second icon according to preset nexuses between icon property comparison results and the animation display parameters; and
   determining the animation display parameters corresponding to the first icon and the second icon according to the search results.

2. The method according to claim 1, wherein the event which controls the display of the icon comprises:
   an event of receiving new service notification by an application corresponding to the icon or an event of clicking the icon by a user.

3. The method according to claim 2, wherein if the event which controls the display of the icon is the event of receiving the new service notification, the method further comprises:
   determining whether the terminal device is in an unlocked state and whether a display area containing the icon is located in a current display page of the terminal device; and
   if the terminal device is in the unlocked state and the display area containing the icon is located in the current display page of the terminal device, determining the animation display parameters corresponding to the icon according to properties of the icon.

4. The method according to claim 1, wherein determining the animation display parameters according to the properties of the icon comprises:
    searching for the animation display parameters corresponding to the properties of the icon according to preset nexuses between the properties of the icon and the animation display parameters; and
    determining the animation display parameters according to search results.

5. The method according to claim 1, wherein the properties comprise category and level.

6. The method according to claim 1, wherein controlling the icon to be displayed in the animated manner in accordance with the animation display parameters comprises:
    controlling the icon to move on an interface of an operating system in accordance with a frequency and a moving direction of the animation display parameters.

7. The method according to claim 1, wherein controlling the icon to be displayed in the animated manner in accordance with the animation display parameters comprises:
    generating a regeneration icon corresponding to the icon in a preset manner; and
    displaying the icon and the regeneration icon on an interface of an operating
    system successively, in accordance with a frequency of the animation display parameters
    and a display sequence of the regeneration icon and the icon.

8. A terminal device, comprising: a processor; and
    a memory for storing instructions executable by the processor, wherein the processor is configured to execute the following steps:
    extracting related information of an application corresponding to the icon, the related information comprising a name of the application, a category of the application, and annunciation information integrated within the icon:
    setting, based on the extracted related information, properties of the icon in accordance with setting rules;
    monitoring an implementation of an event which controls a display of the icon;
    determining animation display parameters according to properties of the icon, if the implementation of the event which controls the display of the icon is detected; and
    controlling the icon to be displayed in an animated manner in accordance with the animation display parameters;
    wherein the icon comprises a first icon and a second icon; and wherein the event which controls the display of the icon comprises:
    an event of updating a position of the first icon to be adjacent to the second icon;
    or an event of the first icon appearing on a interface of an operating system for the first time and being adjacent to the second icon;
    wherein determining the animation display parameters according to the properties of the icon comprises:
    comparing properties of the first icon with properties of the second icon;
    searching for the animation display parameters corresponding to the first icon and the second icon according to preset nexuses between icon property comparison results and the animation display parameters; and
    determining the animation display parameters corresponding to the first icon and the second icon according to the search results.

9. The terminal device according to claim 8, wherein the event which controls the display of the icon comprises:
    an event of receiving new service notification by an application corresponding to the icon or an event of clicking the icon by a user.

10. The terminal device according to claim 9, wherein if the event which controls the display of the icon is the event of receiving the new service notification, the processor is further configured to execute the following steps:
    determining whether the terminal device is in an unlocked state and whether a display area containing the icon is located in a current display page of the terminal device; and
    if the terminal device is in the unlocked state and the display area containing the icon is located in the current display page of the terminal device, determining the animation display parameters corresponding to the icon according to properties of the icon.

11. The terminal device according to claim 8, wherein determining the animation display parameters according to the properties of the icon comprises:
    searching for the animation display parameters corresponding to the properties of the icon according to preset nexuses between the properties of the icon and the animation display parameters; and
    determining the animation display parameters according to search results.

12. The terminal device according to claim 8, wherein the properties comprise category and level.

13. The terminal device according to claim 8, wherein controlling the icon to be displayed in the animated manner in accordance with the animation display parameters comprises:
    controlling the icon to move on an interface of an operating system in accordance with a frequency and a moving direction of the animation display parameters.

14. The terminal device according to claim 8, wherein controlling the icon to be displayed in the animated manner in accordance with the animation display parameters comprises:
    generating a regeneration icon corresponding to the icon in a preset manner; and
    displaying the icon and the regeneration icon on an interface of an operating system successively, in accordance with a frequency of the animation display parameters and a display sequence of the regeneration icon and the icon.

15. A non-transitory computer readable storage medium having stored therein instructions that, when executed by a processor of a terminal device, causes the device to perform the following steps:
    extracting related information of an application corresponding to the icon, the related information comprising a name of the application, a category of the application, and application information integrated within the icon;
    setting, based on the extracted related information, properties of the icon in accordance with setting rules;
    monitoring an implementation of an event which controls a display of the icon;
    determining animation display parameters according to properties of the icon, if the implementation of the event which controls the display of the icon is detected; and
    controlling the icon to be displayed in an manner in accordance with the animation display parameters;

wherein the icon comprises a first icon and a second icon; and wherein the event which controls the display of the icon comprises:
an event of updating a position of the first icon to be adjacent to the second icon;
or an event of the first icon appearing on a interface of an operating system for the first time and being adjacent to the second icon,
wherein determining the animation display parameters according to the properties of the icon comprises:
comparing properties of the first icon with properties of the second icon;
searching for the animation display parameters corresponding to the first icon and the second icon according to preset nexuses between icon property comparison results and the animation display parameters; and
determining the animation display parameters corresponding to the first icon and the second icon according to the search results.

* * * * *